United States Patent
Svensson

(10) Patent No.: US 10,731,544 B2
(45) Date of Patent: Aug. 4, 2020

(54) INTERNAL COMBUSTION ENGINE AND METHOD FOR ITS OPERATION

(71) Applicant: Caterpillar Inc., Deerfield, IL (US)

(72) Inventor: Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 16/139,289

(22) Filed: Sep. 24, 2018

(65) Prior Publication Data

US 2020/0095921 A1    Mar. 26, 2020

(51) Int. Cl.
    *F02B 23/06*      (2006.01)
    *F02D 41/40*      (2006.01)
    *F02M 61/18*      (2006.01)

(52) U.S. Cl.
CPC ...... *F02B 23/0678* (2013.01); *F02B 23/0624* (2013.01); *F02B 23/0651* (2013.01); *F02B 23/0669* (2013.01); *F02B 23/0696* (2013.01); *F02D 41/405* (2013.01); *F02M 61/182* (2013.01); *F02M 61/1813* (2013.01); *F02B 2275/14* (2013.01)

(58) Field of Classification Search
CPC .............. F02B 23/0624; F02B 23/0648; F02B 23/0669; F02B 23/0678; F02B 23/0696; F02B 37/0627; F02B 37/063; F02B 37/0651; F02B 23/0651
See application file for complete search history.

(56) References Cited

U.S. PATENT DOCUMENTS

| | | | |
|---|---|---|---|
| 4,516,549 A | 5/1985 | Brear | |
| 4,635,597 A * | 1/1987 | Ohashi | F02B 23/0651 123/263 |
| 6,557,779 B2 * | 5/2003 | Perr | F02M 45/04 123/468 |
| 6,705,543 B2 * | 3/2004 | Carroll, III | F02M 45/04 239/124 |
| 6,742,492 B2 * | 6/2004 | Kimura | F02B 17/005 123/295 |
| 8,459,229 B2 | 6/2013 | Rothbauer et al. | |
| 8,499,735 B2 | 8/2013 | Eismark et al. | |
| 9,027,529 B2 | 5/2015 | Eismark et al. | |
| 2017/0051657 A1 | 2/2017 | Martinez et al. | |
| 2017/0082013 A1 | 3/2017 | Martinez et al. | |
| 2017/0175667 A1 * | 6/2017 | Zhang | F02D 41/38 |

FOREIGN PATENT DOCUMENTS

JP      05071346 A * 3/1993 .......... F02B 23/0696

OTHER PUBLICATIONS

Komori, JP H05-71346, machine translation (Year: 1993).*

* cited by examiner

*Primary Examiner* — Hung Q Nguyen
*Assistant Examiner* — Mark L. Greene
(74) *Attorney, Agent, or Firm* — Leydig, Voit & Mayer, LTD.

(57) ABSTRACT

In internal combustion engine, a fuel injector has a nozzle tip forming first and second pluralities of nozzle openings configured to inject respective pluralities of first and second fuel jets into a combustion chamber. The first fuel jets are directed between projections formed in a piston during a main injection, and the second fuel jets are directed towards the protrusions during a post injection. The protrusions are asymmetrical to redirect the first fuel jets.

20 Claims, 3 Drawing Sheets

INTERNAL COMBUSTION ENGINE AND METHOD FOR ITS OPERATION

TECHNICAL FIELD

This patent disclosure relates generally to internal combustion engines and, more particularly, to combustion chamber features for direct-injection engines.

BACKGROUND

Most modern engines are direct-injection engines, which means that each combustion cylinder of the engine includes a dedicated fuel injector configured to inject fuel directly into a combustion chamber. While direct-injection engines represent an improvement in engine technology over past designs, in the form of increased engine efficiency and reduced emissions, the improvement of the design of any particular engine is always desirable, especially in light of increasing fuel costs and ever more strict regulations on engine emissions.

In a traditional direct-injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber such as a piston bowl, the flame deck surface of the cylinder head, the cylinder liner or bore, and other surfaces before spreading in all directions. The impingement of the fuel jets with these structures may have a variety of effects including increased emissions because localized areas having higher fuel concentrations may burn rich, while other areas in the combustion chamber may burn lean. Following interaction with the various internal surfaces of the combustion chamber, the fuel jets and resulting flames may also interact with neighboring fuel jets or flames. These interactions can further result in higher temperatures, decreased fuel efficiency, increased heat rejection and component temperatures, and the like.

Various solutions have been proposed in the past for improving an engine's efficiency and reducing its emissions. One example of a previously proposed solution can be seen in U.S. Pat. No. 8,646,428 ("Eismark"), which was granted on Feb. 11, 2014. Eismark describes a piston having a crown in which protrusions having a smooth form are adapted for preserving kinetic energy in a flame plume. The piston is designed to be used in an engine in which quiescent air is provided in the engine cylinder. The fuel injector, forms fuel jets or flames that impinge on features formed in the piston bowl to redirect portions of the flames upward, towards a cylinder head surface, and the remaining portions of the flames in a tangential direction, within the bowl, to achieve better mixing of the combustion gases and decrease or eliminate stagnation zones in a combustion chamber.

While the flow redirection of Eismark may be partially effective in improving burning of fuel in an engine cylinder, it is configured to operate with a quiescent cylinder, which is difficult to attain for each cylinder consistently. In a typical engine, the momentum of intake air into an engine cylinder will possess at least some swirl, which following fuel injection into the cylinder will cause the flames that develop to be carried by the swirling air to one side of the flame and generally towards the cylinder wall.

SUMMARY

The disclosure describes, in one aspect, an internal combustion engine. The internal combustion engine includes an engine block having a cylinder bore, a cylinder head having a flame deck surface disposed at one end of the cylinder bore, and at least one air intake valve associated with the cylinder head and configured to open and allow a flow of intake charge into the cylinder bore. The internal combustion engine further includes a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, the crown portion including a piston bowl having a generally concave shape and extending within the crown portion and a wall, the wall extending peripherally around the piston. A fuel injector having a nozzle tip is disposed in fluid communication with the combustion chamber. The nozzle tip has a first plurality of nozzle openings configured to inject a plurality of first fuel jets into the combustion chamber, each of the plurality of first fuel jets being provided along a respective first fuel jet centerline. A plurality of protrusions is disposed in the piston bowl adjacent the wall, each of the plurality of protrusions including a first side surface and a second side surface, the first side surface having a generally concave shape, the second side surface having a generally flat or convex shape, wherein each of the plurality of protrusions is disposed between two adjacent respective first fuel jet centerlines. In one embodiment, the fuel injector nozzle tip has a second plurality of nozzle openings configured to inject a plurality of second fuel jets, each of the plurality of second fuel jets being provided along a respective second fuel jet centerline. Each second fuel jet centerline intersects a respective one of the plurality of protrusions.

In another aspect, the disclosure describes a method of operating an internal combustion engine. The method includes slidably disposing a piston within a cylinder bore, the piston including a crown portion extending below a top surface of a piston body, the crown portion including a bowl having a generally concave shape and extending within the crown portion and a wall, the wall extending peripherally around the piston body. The crown portion includes a plurality of protrusions disposed in the bowl adjacent the wall, each of the plurality of protrusions including a first side surface and a second side surface, the first side surface having a generally concave shape, the second side surface having a generally flat or convex shape, each of the plurality of protrusions lying along a respective radial axis. The method further includes providing a plurality of first fuel jets over a first time period during the compression stroke and/or expansion stroke, each of the plurality of first fuel jets being provided along one of the respective radial axes; and providing a plurality of second fuel jets over a second time period during the compression stroke and/or expansion stroke, the second time period being after the first time period. Each of the plurality of second fuel jets is provided in a direction that is between two adjacent respective radial axes.

In yet another aspect, the disclosure describes a method for operating an internal combustion engine. The method includes admitting a swirling air mass into a combustion chamber; providing a plurality of first fuel jets into the combustion chamber; redirecting the plurality of first fuel jets within the combustion chamber; and providing a plurality of second fuel jets into the combustion chamber. The plurality of second fuel jets is provided along radial axis that are disposed between adjacent first fuel jets.

DETAILED DESCRIPTION

Figure 1:
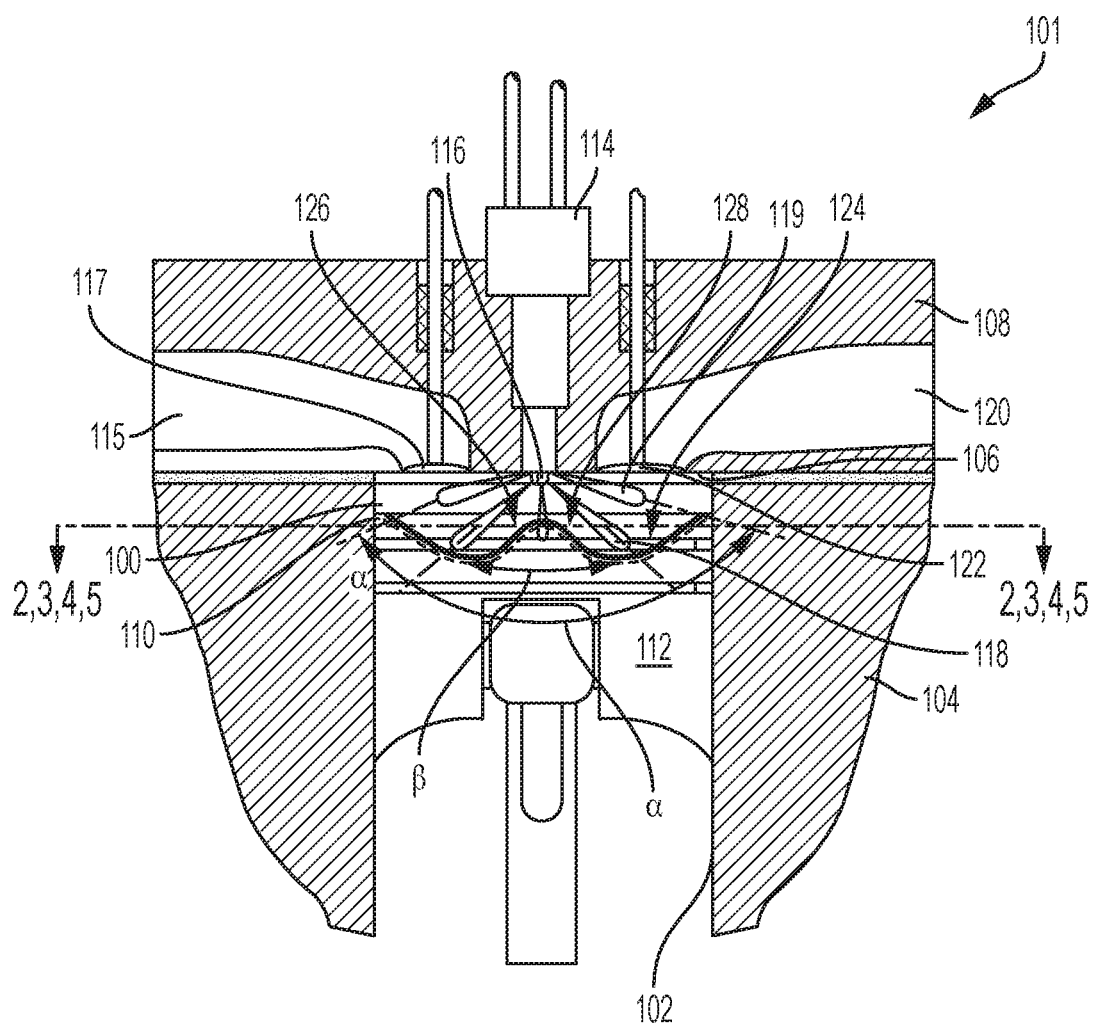
FIG. 1 is a cross section of an engine combustion chamber in accordance with the disclosure.

This disclosure relates to internal combustion engines and, more particularly, to features incorporated within at least one combustion chamber of the engine to redirect fuel jets provided by separate fuel injector nozzle openings towards a center portion of the combustion chamber, for example, towards a fuel injector, even for cylinders in which incoming air may include swirl. In the present disclosure, the term "jets" or "fuel jets" describes reacting (i.e. burning) or non-reacting streams of fuel, alone or in mixture with air, that is provided into an engine cylinder. These fuel jets may therefore comprise fuel droplets dispersed in air, or a flame once the fuel begins to oxidize with the surrounding air. In accordance with the disclosure, the fuel jets are redirected and also segregated during a majority of the injection time and/or burn time to promote better oxygen utilization within the combustion chamber as compared to previously proposed or known combustion systems.

The various exemplary embodiments described herein include structures and features that operate or result in redirecting fuel jets radially with respect to the cylinder bore of an engine, to thus minimize or, at least, delay interaction between adjacent fuel jets entering the combustion chamber. The type of fuel being provided to the cylinder may be a spray of liquid fuel such as diesel or gasoline, or a jet of gaseous fuel such as natural or petroleum gas. The design is configured to impart an asymmetric effect to a combined air and fuel moving mass of fluids, which initially have a swirling aggregate velocity vector and which are redirected to have an aggregate radial velocity vector towards a center of the piston bore.

Stated differently, air entering into the cylinder may have swirl, i.e., radial and primarily tangential velocity components of each air particle. As fuel is injected into the chamber, it mixes with the air. The fuel particles or droplets have generally a radial velocity component such that, when the fuel droplets mix and evaporate into the swirling air, the tangential velocity component of the resulting mixtures is reduced, but not eliminated. The remaining tangential velocity component is countered by uneven or asymmetrical surfaces presented on protrusions on the piston, which impart a counter-swirl tangential velocity component to the fuel/air mixture that impinges on and is affected by the protrusion surfaces. The counter-swirl tangential velocity component of the fuel/air mixture thus cancels or eliminates the original tangential velocity of the swirling air mass, such that the resulting fuel/air mixture possesses a radially inward velocity component. In this way, a burning air/fuel mixture is directed inwardly relative to the piston, where additional oxygen to support the burning fuel is available. The disclosed embodiments can be tailored to counter many different particular swirling patterns that may exist in engine cylinders, and essentially transform a swirling combustion system into a quiescent combustion system. Some of the benefits of such a combustion system include reduced heat rejection, in that the flame is guided towards the center of the cylinder and away from the metal structures of the engine that surround and define the cylinder, which in turn leads to lower component temperatures, increased fuel efficiency, and a more uniform fuel/air mixture, which also leads to lower engine emissions.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the cylinder bore 102. A fuel injector 114 is mounted in the cylinder head 108. The fuel injector 114 has a tip 116 that protrudes within the combustion chamber 100 through the flame deck surface 106 such that it can directly inject fuel into the combustion chamber 100.

Figure 2:
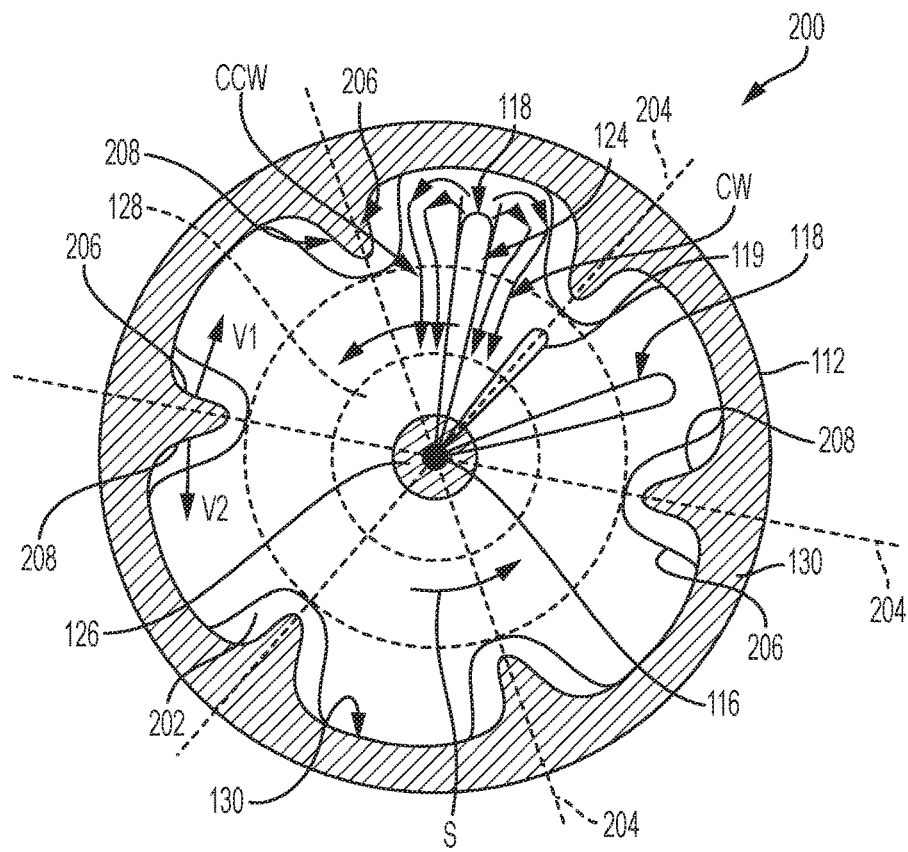
FIG. 2 is a top view in cross section of an engine piston in accordance with a first embodiment of the disclosure.

During operation of the engine 101, air or an intake charge, which may include recirculated exhaust gas, fuel and/or other fluids in mixture with intake air, is admitted into the combustion chamber 100 via an air inlet passage 115 when one or more intake valves 117 (one shown) are open during an intake stroke. As is the case in most engines, an incoming airflow into the combustion chamber 100 through the one or more intake valves 117 will be highly turbulent and possess swirling portions around one or more axes, which are imparted into the air flow by the various bends and corners in the air inlet passage 115 and other structures such as air passing over and around the intake valve 117. In a known configuration, high pressure fuel is permitted to flow through a plurality of nozzle openings in the tip 116. Each nozzle opening creates a fuel jet 118 that generally disperses to create a fuel/air mixture, which in a compression ignition engine auto-ignites and combusts. The fuel jets 118 may be provided from the injector at an included angle, β, of between 110 and 150 degrees, but other angles may also be used. The fuel jets 118 enter the combustion chamber 100 in a generally radially outward direction as the fuel travels through the injector openings. In the illustrated embodiment, the fuel injector 114 may include two sets or rows of nozzle openings in the tip 116, which are operated independently by two check valves (not shown). In one embodiment, the nozzle opening size the row of nozzle openings providing the first fuel jets 118 may be larger than the nozzle opening size of the row of nozzle openings providing the second fuel jets 119. As is also shown in FIG. 2, the second set of openings may produce a second set of fuel jets 119, which can be provided at different times, at a different, for example, a larger included angle, a, and at different dispersion areas of the cylinder. Following combustion, exhaust gas is expelled from the combustion chamber through an exhaust conduit 120 when one or more exhaust valves 122 (one shown) is/are open during an exhaust stroke and/or intake stroke.

The uniformity and extent of fuel/air mixing in the combustion cylinder is relevant to the combustion efficiency as well as to the amount and type of combustion byproducts that are formed, and to the rate of combustion within the cylinder. For example, fuel-rich mixtures, which may be locally present within the combustion chamber 100 during a combustion event due to insufficient mixing, or insufficient air available locally around those areas, may lead to higher soot, hydrocarbon, and carbon monoxide emissions, and lower combustion efficiency. In the illustrated embodiments, improved fuel/air combustion is managed for each fuel jet by forming a plurality of protrusions, which asymmetrically funnel or guide flames created when streams of air and fuel in the cylinder burn. This flame guiding is also helpful in achieving a more complete combustion within the cylinder, which can lower soot and other emissions of the engine. The direction of flame propagation after the flames have been redirected by interaction with features in the piston bowl is such that at least a portion of the flames is directed to counter a swirl present in the cylinder. The net effect of the directed flames and swirling air is a direction of the flames towards the center of the piston, where air is available to burn an air/fuel mixture and oxidize soot.

Each protrusion has two sides, a first side that has a generally concave shape and a normal vector that faces towards or against a swirling direction, and a second side that has a generally flat and/or convex shape and a normal vector that faces with or in the same direction as the swirling direction of air in the combustion chamber 100. In this way, each protrusion serves, accept, redirect and segregate therein on either side a portion of each of two adjacent fuel jets originating from the plurality of nozzle openings in the fuel injector, and redirect them towards the center of the combustion chamber 100. It is contemplated, however, that the protrusions may also be symmetrical at least over a portion of their height relative to the piston bowl.

A first exemplary embodiment of the piston 112 is shown in FIG. 2. In the illustration of FIG. 2, only a top surface 200 of the piston crown 110 of the piston 112 is shown in cross section from a top perspective for illustration. The piston 112 includes a bowl 124 formed in the piston crown 110 that includes a central, raised conical protrusion 126 at the center of a conical, convex surface 128. The bowl 124 has a generally circular periphery and is defined within a circular crown wall 130. Included in the top surface 200 is a plurality of protrusions 202, which are disposed within the bowl 124 and along a periphery of the bowl 124 adjacent the wall 130. Six protrusions 202 are shown herein, but it should be appreciated that any number of protrusions can be used depending on the number of nozzle openings in the tip 116 of the injector. The protrusions in the top surface 200 are arranged at regular intervals along equally distributed radial axes 204. Each axis 204 is disposed at exactly the same angle between the spray directions of adjacent nozzle tip openings of the fuel injector 114 such that a first fuel jet 118 will emanate from the tip 116 in a radial direction between two adjacent axes 204, as shown. A second fuel jet 119, which is provided at a different time, may emanate from the tip 116 in a second radial direction towards each protrusion 202. For illustration, the first fuel jets 118 may deliver a majority of the fuel in a first main injection within the combustion chamber, and the second fuel jets 119 may deliver a minority, or less than half, of the fuel in a post-main injection, i.e., after delivery of the first fuel jets 118 has been initiated, to consume any oxygen that may, at least temporarily, remain in the cylinder in areas between the main fuel jets 118. It is contemplated that the second fuel jets 119 may be provided in a time period that at least partially may overlap the time period in which the first fuel jets 118 are also provided. Providing the second fuel jets 119 may be carried out either during the compression stroke at a time later than injection of the first fuel jets 118, and/or during the expansion stroke, to help promote and prolong oxidation of fuel within the cylinder and also to promote oxidation of soot with oxygen that may still remain in the cylinder.

In the schematic embodiment shown in FIG. 2, the development of two adjacent first fuel jets 118 is shown at different instances in time. The lower, not fully developed jet to the right of the figure is shown at an instant when the fuel jet 118 has been emanated from the tip 116 but has not yet reached the wall 130. During this, initial time in an injection, the air in the cylinder and, thus, in and above the bowl 124, may have a generally circular or spiral momentum in a counterclockwise direction indicated by the block arrows "S." While the fuel jet 118 is travelling through a moving region of air, the speed of the air, which may include a tangential velocity vector because if the swirling momentum may not affect the radial travel direction of the first fuel jet 118, at least initially. However, at a later instant, as shown by the first fuel jet 118 shown counterclockwise and to the left of the original jet, towards the top of the figure, the fuel jet or flame 118 may impinge against the wall 130 and separate into two tangential jets, each tangential jet heading towards the two adjacent protrusions 202 that flank the impingement site. In the area between two adjacent first fuel jets 118, a second fuel jet 119 from a second row of orifices formed in the tip 116 may be provided.

As can be seen in FIG. 2, the protrusions 202 present different profiles or shapes to asymmetrically guide the tangential jets that impinge thereon. Such asymmetry is optional and may be omitted for combustion systems having a quiescent flow of incoming fluids that contain air into the cylinder. In the illustrated embodiment, each protrusion 202 includes a first side face 206, which faces in a direction against the swirl S, and a second side face 208, which faces in a direction with the swirl S. In the nomenclature used herein, a direction in which each side face of the protrusion "faces" means the direction in which a normal vector that is generally perpendicular to the respective side face and point away from the surface in an outward direction with respect to the protrusion is pointing. Two such vectors, V1 and V2, are shown on one of the protrusions 202 on the left side of the figure for illustration. In various embodiments, the first and second side faces of the protrusions may be different from one piston to another, but they all will share a similar trend, which is that the first side face 206 of each protrusion 202, i.e., on the side that faces against the swirling direction S, will be generally concave such that a larger turning effect is provided to fluids impinging and being redirected by the first side face 206 to counteract the swirl that is present in the swirling direction S; the same trend also includes that the second side face 208 of each protrusion 202, i.e., on the side that faces away from the swirling direction S, will be generally flat or convex such that a lesser turning effect is provided to fluids impinging and being redirected by the second side face 208, because those fluids are already turning in the opposite direction as the swirling direction S.

As can be seen from FIG. 2, when the first fuel jets 118 impinge onto the wall 130, each separates into many sub-streams that include two tangential streams that follow the curvature of the wall 130 until they meet the protrusions 202 that flank the area onto which particular fuel jet 118 impinges along the wall 130. These two tangential jets can be referred to as the clockwise (CW) subjet, i.e. the subjet that turns in a location that is located in a clockwise direction relative to the particular fuel jet 118, and the counter-clockwise (CCW) subjet, i.e. the subjet that turns in a location that is located in a counter-clockwise direction relative to the particular fuel jet 118. For a more complete burn in the combustion chamber 100, it is desired to have both the CW and CCW fuel subjets advance in a radial direction towards the center of the combustion cylinder. Oxygen that may be present in the areas immediately radially inward from the circular segments of the cylinder that are occupied by the protrusions 202 themselves can be consumed by the second fuel jets 119 provided towards the protrusions 202, as shown in FIG. 2. The different shapes of the first and second side faces 206 and 208 can accomplish this taking under consideration the swirl S in the cylinder. Thus, the CW subjet in the embodiment shown makes a shallow turn off the second side face 208, because it will be carried along the swirl S as it advances towards the tip 116. For the same reason, the CCW subjet makes a sharper turn off the first side face 206, because its course will also be adjusted as it advances against the swirl S.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general the various asymmetrical protrusions can be formed in a structure that the fuel jet will impinge upon when injected by an injector into a combustion chamber. The protrusions arcuate indents and the redirection and segregation of fuel jets and plumes they provide are effective in promoting faster combustion and redirection of developing flames towards more oxygen-rich areas at the center of the cylinder. In general, the systems and methods described herein are applicable in internal combustion engines that operate with fewer or more than four strokes.

Figure 3:
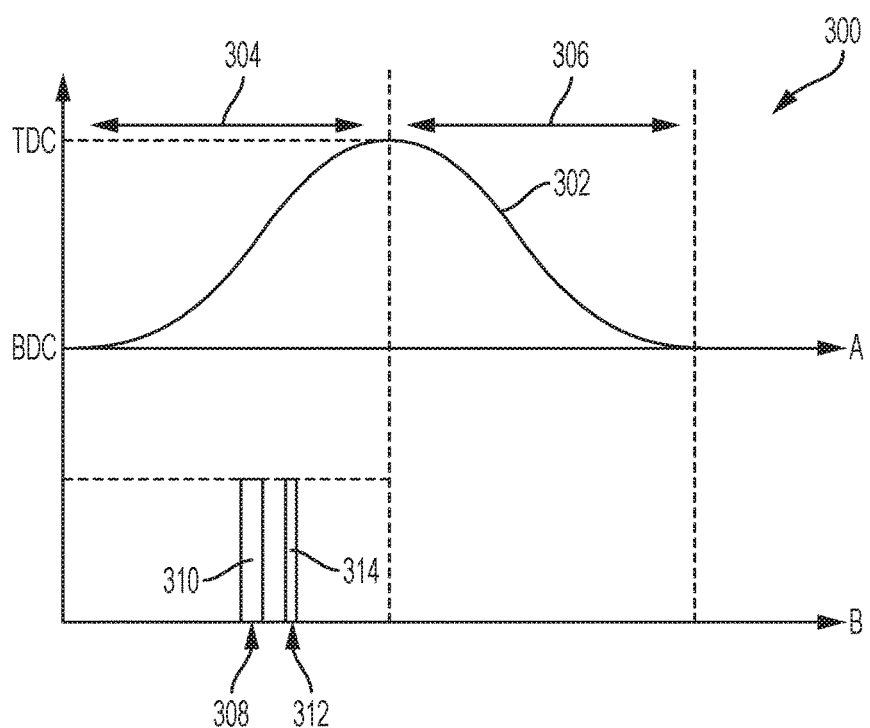
FIG. 3 is a diagram for a fuel timing strategy in accordance with the disclosure.

A chart illustrating one possible fuel injection strategy in accordance with the disclosure is shown in FIG. 3, which illustrates an exemplary fuel timing chart 300. In reference to this figure, two time aligned axes are shown, a first axis, A, representing a location 302 of the piston within the bore, and a second axis, B, representing a state of the fuel injector over a compression stroke 304 and an expansion stroke 306 in a four-stroke combustion cycle, which is exemplary. As shown in the graph, during the compression stroke 304, the location 302 of the piston, for example, the piston shown in FIG. 1, changes as the piston travels from a bottom dead center (BDC) position towards a top dead center (TDC) position within the piston bore. At a first time period 308 before TDC, a first, main injection event 310 may be carried out to deliver a majority of the fuel within the cylinder. As discussed, before, the main injection event 310 may produce the first fuel jets 118 that are oriented towards the areas between protrusions of the piston. At a second time period 312, a second, post injection 314 may be carried out to deliver a minority of the fuel into the cylinder. The post injection event 314 may produce the second fuel jets 119 that are oriented towards the radial segments of the cylinder occupied by the protrusions. As can be appreciated, other fueling strategies may also be used. For example, the main injection event may also include pre- and other post-injection events, and the post injection event 314 may be broken into two or more events. Further, while the post injection event 314 is shown during the compression stroke 304, it may also be carried out during the expansion stroke 306, or in phases both during the compression stroke 304 and the expansion stroke 306. Even further, although the first and second time periods 308 and 312 are shown as being discrete, they may also overlap.

Figure 4:
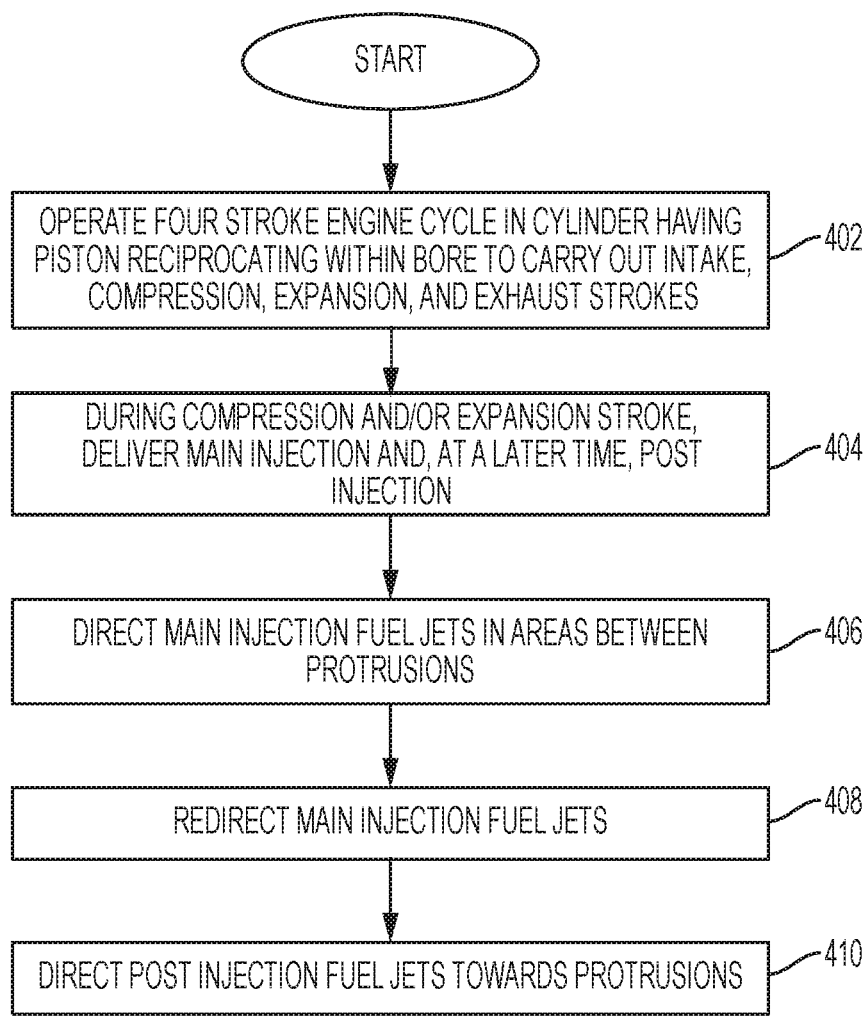
FIG. 4 is a flowchart for a method in accordance with the disclosure.

A method for operating a non-axisymmetric piston engine is shown in the flowchart of FIG. 4. In accordance with the method, a four stroke combustion system is operated in an engine at 402, which includes an intake stroke, compression stroke, expansion or power stroke, and exhaust stroke. During the compression stroke, a main injection event delivers a majority of a fuel quantity into the cylinder at 404. Fuel jets from the main injection event are redirected within the cylinder at 406. The redirection of the fuel jets is accomplished by contact with asymmetrical faces on protrusions formed on an piston at 408. At a time after the main injection event, a post injection event is carried out at 410. Fuel jets form the post injection event are directed towards areas that lie between the fuel jets of the main injection event.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:
1. An internal combustion engine, comprising:
an engine block having a cylinder bore;
a cylinder head having a flame deck surface disposed at one end of the cylinder bore;
at least one intake valve associated with the cylinder head and configured to open and allow a flow of intake charge into the cylinder bore;
a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, the crown portion including a piston bowl having a generally concave shape and extending within the crown portion and a wall, the wall extending peripherally around the piston;
a fuel injector having a nozzle tip disposed in fluid communication with the combustion chamber, the nozzle tip having a first plurality of nozzle openings configured to inject a plurality of first fuel jets into the combustion chamber, each of the plurality of first fuel jets being provided along a respective first fuel jet centerline;
a plurality of protrusions disposed in the piston bowl adjacent the wall, each of the plurality of protrusions including a first side surface and a second side surface, wherein each of the plurality of protrusions is disposed between two adjacent ones of the respective first fuel jet centerlines;
wherein the fuel injector nozzle tip has a second plurality of nozzle openings configured to inject a plurality of second fuel jets, each of the plurality of second fuel jets being provided along a respective second fuel jet centerline;
wherein each of the respective second fuel jet centerlines intersects a respective one of the plurality of protrusions;

wherein the fuel injector is configured and operates to provide the plurality of first fuel jets during a main injection event during a compression stroke and/or an expansion stroke; and wherein the fuel injector is configured and operates to provide the plurality of second fuel jets during a post injection event during the compression stroke and/or the expansion stroke, which post injection event occurs after an initiation of the main injection event.

2. The internal combustion engine of claim 1, wherein a number of the first plurality of nozzle openings matches a number of the plurality of protrusions.

3. The internal combustion engine of claim 1, wherein a number of the second plurality of nozzle openings matches a number of the first plurality of nozzle openings.

4. The internal combustion engine of claim 1, wherein the plurality of protrusions are each arranged at regular intervals along equally distributed radial axes along the top surface, each of the distributed radial axes being disposed at an angle that is between spray directions of adjacent ones of the first nozzle openings of the fuel injector such that each of the first fuel jets emanates in a radial direction between two adjacent ones of the equally distributed radial axes.

5. The internal combustion engine of claim 1, wherein the plurality of protrusions are each arranged at regular intervals along equally distributed radial axes along the top surface, each of the equally distributed radial axes being aligned with one of the second plurality of nozzle openings of the fuel injector such that each of the second fuel jets emanates in a radial direction towards a corresponding protrusion of the plurality of protrusions.

6. The internal combustion engine of claim 1, wherein the first plurality of nozzle openings are configured to inject the plurality of first fuel jets at a first angle relative to a longitudinal axis of the cylinder bore and the second plurality of nozzle openings are configured to inject the plurality second fuel jets at a second angle relative to the longitudinal axis of the cylinder bore, the first angle being different from the second angle.

7. A method of operating an internal combustion engine, the method comprising:

slidably disposing a piston within a cylinder bore, the piston including a crown portion extending below a top surface of a piston body, the crown portion including a bowl having a generally concave shape and extending within the crown portion and a wall, the wall extending peripherally around the piston body, wherein the crown portion includes a plurality of protrusions disposed in the bowl adjacent the wall, each of the plurality of protrusions including a first side surface and a second side surface, each of the plurality of protrusions lying along a respective radial axis;

providing a plurality of first fuel jets over a first time period during a compression and/or expansion stroke, each of the plurality of first fuel jets being provided between two adjacent ones of the respective radial axes; and providing a plurality of second fuel jets over a second time period during the compression and/or expansion stroke, the second time period beginning after the first time period begins;

wherein each of the plurality of second fuel jets is provided in a direction that is between two adjacent ones of the first fuel jets.

8. The method of claim 7, wherein each of the plurality of second fuel jets is provided in a direction towards one of the plurality of protrusions.

9. The method of claim 7, wherein the plurality of first fuel jets represents a main injection event that delivers a majority of a fuel quantity required to carry out an expansion stroke.

10. The method of claim 9, wherein the plurality of second fuel jets represents a post injection event that delivers a minority of the fuel quantity required to carry out the expansion stroke.

11. The method of claim 7, wherein a number of the plurality of first fuel jets matches a number of the plurality of protrusions.

12. The method of claim 7, wherein a number of the plurality of second fuel jets matches a number of the plurality of first fuel jets.

13. The method of claim 7, wherein a number of the plurality of second fuel jets matches a number of the plurality of protrusions.

14. The method of claim 7, wherein the first fuel jets are provided at a first angle relative to a longitudinal axis of the cylinder bore and the second fuel jets are provided at a second angle relative to the longitudinal axis of the cylinder bore, the first angle being different from the second angle.

15. A method for operating an internal combustion engine, comprising:

admitting a swirling intake charge mass into a combustion cylinder;

providing a plurality of first fuel jets into the combustion cylinder;

redirecting the plurality of first fuel jets within the combustion cylinder;

providing a plurality of second fuel jets into the combustion cylinder after beginning to provide the plurality of first fuel jets;

wherein the plurality of second fuel jets are each provided along a radial axis that is disposed between adjacent ones of the first fuel jets.

16. The method of claim 15, wherein redirecting the plurality of first fuel jets is accomplished by:

defining the combustion cylinder at least partially by a crown portion of a reciprocable piston, the crown portion including a bowl having a plurality of protrusions disposed peripherally around the bowl; and directing the plurality of first fuel jets along axes extending between adjacent ones of the protrusions.

17. The method of claim 16, wherein providing the plurality of second fuel jets includes directing each of the plurality of second fuel jets towards one of the plurality of protrusions.

18. The method of claim 15, wherein the plurality of first fuel jets delivers a majority of a fuel quantity for an expansion stroke of the internal combustion engine.

19. The method of claim 18, wherein the plurality of second fuel jets delivers a remaining portion of the fuel quantity for the expansion stroke of the internal combustion engine.

20. The method of claim 15, wherein the first fuel jets are provided at a first angle relative to a longitudinal axis of the combustion cylinder and the second fuel jets are provided at a second angle relative to the longitudinal axis of the combustion cylinder, the first angle being different from the second angle.

* * * * *